United States Patent
Andersson

[11] Patent Number: 6,076,887
[45] Date of Patent: Jun. 20, 2000

[54] VEHICLE SEAT

[75] Inventor: Sture Andersson, Nacka, Sweden

[73] Assignee: Autoliv Development AB, Sweden

[21] Appl. No.: 09/125,060

[22] PCT Filed: Jan. 20, 1997

[86] PCT No.: PCT/SE97/00081
§ 371 Date: Nov. 5, 1998
§ 102(e) Date: Nov. 5, 1998

[87] PCT Pub. No.: WO97/28982
PCT Pub. Date: Aug. 14, 1997

[30] Foreign Application Priority Data

Feb. 6, 1996 [GB] United Kingdom .................. 9602342

[51] Int. Cl.[7] .................. B60N 2/42; B60R 21/13
[52] U.S. Cl. .................. 297/216.1; 297/216.13; 297/216.15; 297/216.16; 297/216.19
[58] Field of Search .................. 297/216.1, 216.13, 297/216.15, 216.16, 216.19, 284.1

[56] References Cited

U.S. PATENT DOCUMENTS

| | | | |
|---|---|---|---|
| 2,725,921 | 12/1955 | Markin | 297/216.15 |
| 3,578,376 | 5/1971 | Okazaki-shi et al. | 297/216.16 X |
| 3,610,679 | 10/1971 | Amato | 297/216.16 X |
| 3,731,972 | 5/1973 | McConnell | 297/216.19 |
| 3,732,944 | 5/1973 | Kendall | 297/216.15 X |
| 3,957,304 | 5/1976 | Koutsky et al. | 297/216.1 X |
| 3,998,291 | 12/1976 | Davis | |
| 4,008,917 | 2/1977 | Sigwarth et al. | 297/216.1 X |
| 4,512,604 | 4/1985 | Maeda et al. | 297/216.1 |
| 5,203,600 | 4/1993 | Watanabe et al. | |
| 5,490,706 | 2/1996 | Totani | 297/216.1 X |
| 5,564,520 | 10/1996 | Forsythe | 297/216.1 X |
| 5,645,316 | 7/1997 | Aufrere et al. | 297/216.3 |
| 5,697,670 | 12/1997 | Husted et al. | 297/216.13 |
| 5,716,102 | 2/1998 | Ray et al. | 297/216.13 |
| 5,743,591 | 4/1998 | Tame | 297/216.1 |
| 5,810,417 | 9/1998 | Jesadanont | 297/216.13 X |
| 5,823,627 | 10/1998 | Viano et al. | 297/216.13 X |
| 5,908,219 | 6/1999 | Bohmler | 297/216.1 |

FOREIGN PATENT DOCUMENTS

| | | | |
|---|---|---|---|
| 2545840A1 | 4/1977 | Germany | |
| 1906813 | 10/1978 | Germany | 297/216.19 |

Primary Examiner—Peter M. Cuomo
Assistant Examiner—Rodney B. White
Attorney, Agent, or Firm—Venable; George H. Spencer; Robert Kinberg

[57] ABSTRACT

A vehicle seat (1) comprises a squab (2) and a back (3). The seat is associated with a roll-over sensor (11) which activates a pyrotechnic charge within a cylinder (12) to cause the seat (1) to move to an alternative configuration in which the head of the occupant of the seat is moved so that the clearance between the head of the occupant and the roof is increased. The head of the occupant is thus spaced further from the roof of the vehicle, since the roof of the vehicle may be depressed during a roll-over accident.

16 Claims, 4 Drawing Sheets

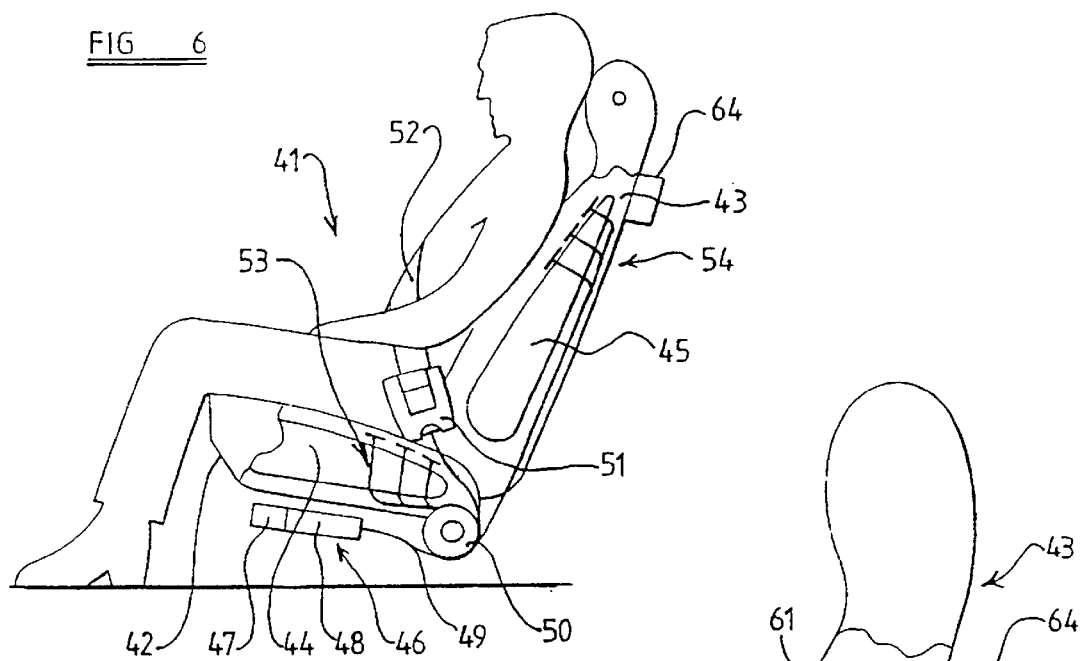
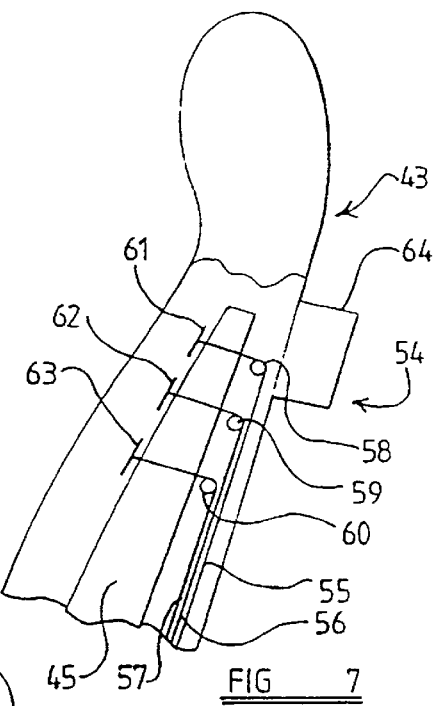
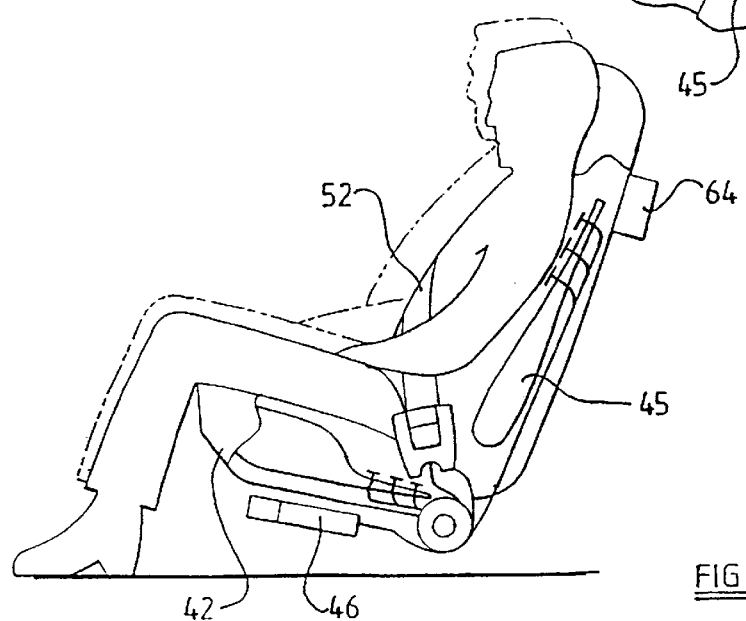

VEHICLE SEAT

BACKGROUND OF THE INVENTION

The present invention relates to a vehicle seat and more particularly relates to a vehicle seat adapted to be used in a motor vehicle such as motor car.

It is known that motor vehicles, such as motor cars, may be involved in accidents which involve the vehicle rolling over. Such accidents are known as roll-over accidents.

The parameters of a roll-over accident are typically very different from the parameters of an accident involving a front, rear or side impact. The course of the accident is much slower. The front, rear or side impact usually occurs very swiftly, and the entire accident is completed within a very brief period of time. In a roll-over accident it takes a much longer period of time for the vehicle to actually roll over. During the course of a roll-over accident the roof of the vehicle may be depressed.

It has been proposed previously to use a roll-over sensor, which may be adapted to measure the orientation of the vehicle or the angular speed of the vehicle to activate a mechanism which moves a roll bar into a protecting position, or to activate pre-tensioners (which pre-tension safety belts) or air bags, when a roll-over accident occurs.

A roll bar is intended to prevent the roof from being depressed.

SUMMARY OF THE INVENTION

The present invention seeks to provide a vehicle seat adapted to provide protection for a person sitting on the seat should a roll-over accident occur.

According to this invention there is provided a vehicle seat, the seat comprising a squab and a backrest, the seat being associated with a roll-over sensor, means being provided, activated by the roll-over sensor to change the configuration of at least part of the seat in such a way that the clearance between the head of an occupant of the seat and the roof of the vehicle is increased.

Preferably the means to change the configuration of the seat are adapted to move at least part of the front surface of the back of the seat rearwardly.

Conveniently the means to change the configuration of the seat comprise means which move at least part of the back of the seat rearwardly with a pivoting motion.

In one embodiment the means to change the configuration of the seat comprise means to move a central part of the back of the seat rearwardly with a pivotal motion, the back of the seat comprising two further side parts which remain in their initial position as the central part pivots.

Conveniently the means to change the configuration of the seat comprise means to move at least part of the upper surface of the squab of the seat downwardly.

In one preferred embodiment the squab of the seat is mounted on rigid pivotal links, the means to change the configuration of the seat initially retaining the seat in a predetermined position, but responding to a roll-over accident sensed by the sensor to move the pivotal links to an alternate condition causing the rear part of the squab of the seat to be lowered and causing the back of the seat to move rearwardly with a pivotal motion.

Conveniently the pivotal links are such that the front of the seat moves forwardly.

Alternatively the means to change the configuration of the seat comprise means to compress a compressible element present within the back or squab of the seat.

In another embodiment the means to change the configuration of the seat comprise a pyrotechnic charge adapted to move a piston within a cylinder, the pyrotechnic charge being activated by the roll-over sensor.

In one embodiment the piston is connected to a wire, the wire being adapted to move part of the back of the seat in a pivotal manner.

Preferably the wire is further connected to locking means adapted to lock the central part of the back of the seat in an initial position relative to the side parts, the locking means being freed as a consequence of tension being applied to the wire.

In another embodiment the housing is connected to the chassis of the vehicle and the piston is connected to a rod which is connected to part of the squab of the seat to cause the squab of the seat to move.

Alternatively the piston is connected to a wire, strands of the wire passing across guides provided on one side of the compressible element, and terminating in engagement means which engage the other side of the compressible element so that tension applied to the strands of the wire cause the compressible element to be compressed.

Advantageously the pyrotechnic charge additionally actuates a pre-tensioner which pre-tensions a safety belt associated with the vehicle seat.

Preferably the seat is provided with a safety belt which passes through guide means which are located on the upper part of the backrest of the seat.

Conveniently the seat belt is associated with a retractor mounted on the seat.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 6 is a side view of a further embodiment of the seat in accordance with the invention, again with parts being cut away for the sake of clarity of illustration;

FIG. 7 is an enlarged view of part of the embodiment of FIG. 6; and

FIG. 8 is a further view of the embodiment of FIG. 6 showing the seat in an alternate condition, the position of the occupant of the seat in the original condition of the seat being shown in phantom.

DETAILED DESCRIPTION OF THE INVENTION

As will be understood from the following description, a vehicle seat in accordance with the invention is associated with a roll-over sensor. In response to a roll-over accident being sensed by the roll-over sensor, the configuration of at least part of the seat is altered, relative to its initial position, in such a way that the clearance between the head of the occupant of the seat and the roof of the vehicle is increased. Thus, relative to the ordinary orientation of the vehicle, the head of the occupant of the seat is lowered. Consequently, the roof will have to be deformed by a greater extent, than would otherwise be the case, during a roll-over accident before the roof will actually strike the head of the occupant of the vehicle.

Figure 1:
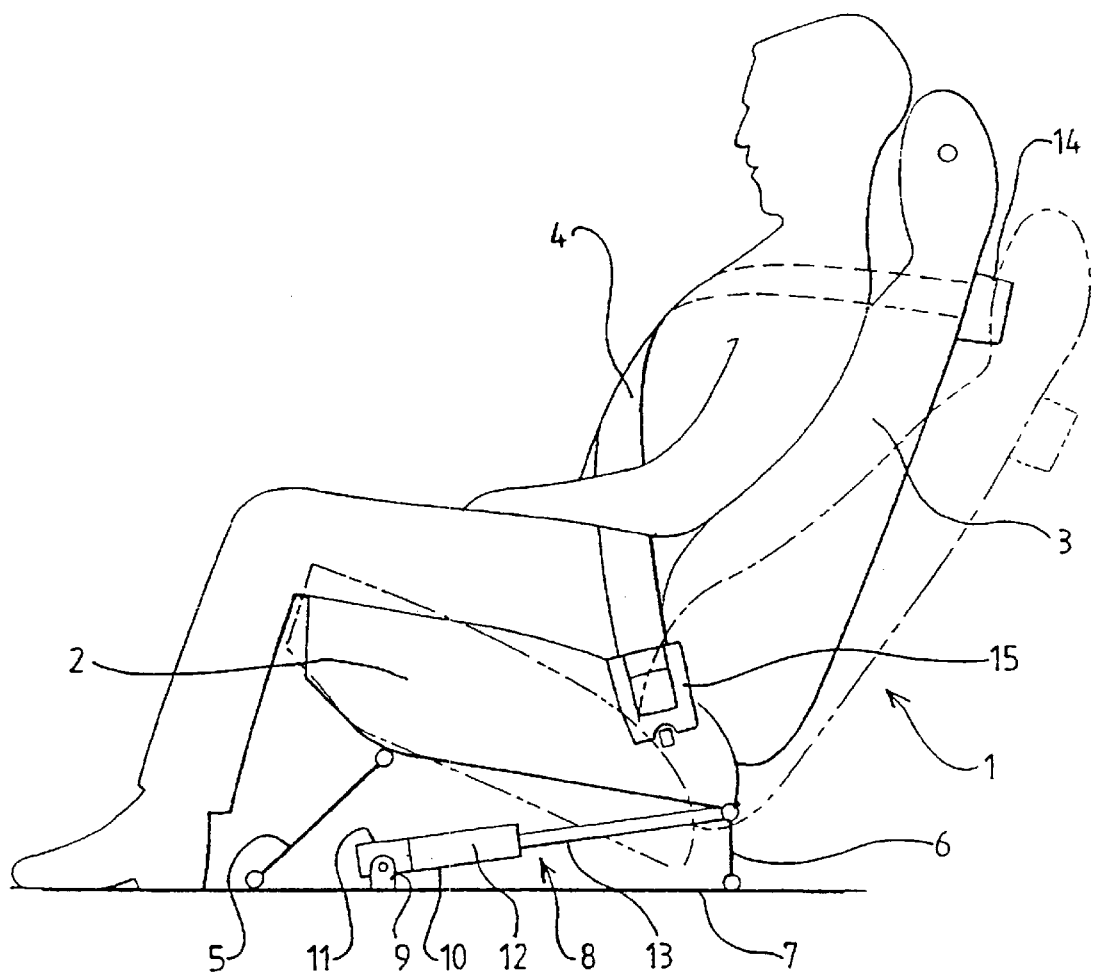
FIG. 1 is a side view of a first embodiment of a vehicle seat in accordance with the invention, an initial position of the seat being shown in solid lines and a subsequent position of the seat being shown in phantom.
Figure 2:
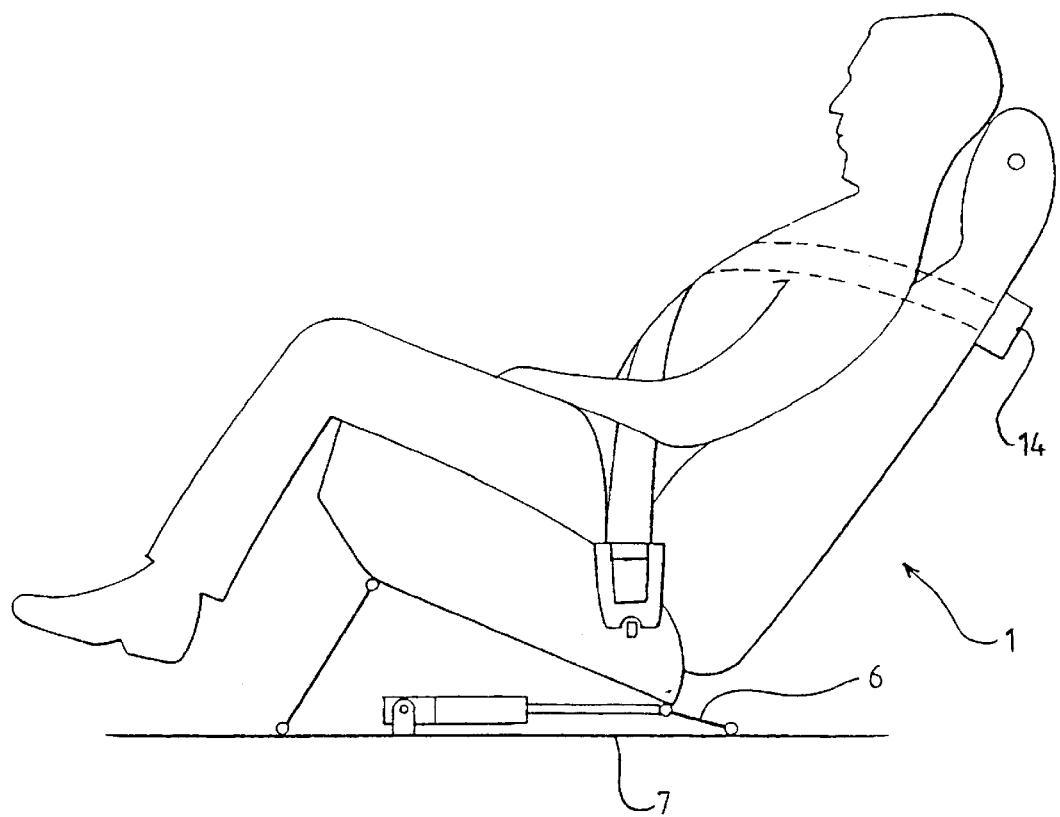
FIG. 2 is a view corresponding to FIG. 1 illustrating the seat in its subsequent position.

Referring initially to FIGS. 1 and 2 of the accompanying drawings, a vehicle seat 1 in accordance with the invention comprises a squab 2 and a backrest 3. The seat is intended to accommodate an occupant who will be restrained in position by means of a seat belt 4.

The squab 2 of the seat is supported in an initial position, as shown in solid lines in FIG. 1, by means of rigid links 5, 6. The rigid links are pivotally connected to the floor 7 of the vehicle and also to the lower part of the squab 2 of the seat. It is envisaged that two links 5 would be provided at the front of the seat and two links 6 would be provided at the rear of the seat.

The seat is held firmly in the position initially illustrated by means of a structure 8. The structure 8 extends from a mounting 9 provided on the floor of the vehicle beneath the squab of the seat to the upper pivot point of the link 6 on the under surface of the squab 2 of the seat.

The structure 8 comprises a housing 10 which is connected to the mounting 9, the housing 10 containing a roll-over sensor 11 and a chamber 12 which contains a pyrotechnic charge and which also contains a piston. The piston is connected to a rod 13 which extends from the housing 10 to the upper part of the link 6.

The seat belt 4, has one end wound on a retractor 14 which is mounted, at shoulder height, on the upper part of the backrest 3 of the seat. The seat belt 4 is connected to a buckle 15 that is mounted on the squab 2 of the seat by means of a tongue on the seat belt. The free end of the seat belt 4 is also connected to the squab 2 of the seat on the side of the seat opposite to the buckle 15.

In the region of the retractor the seat belt may pass through a guide which is fixed in position relative to the seat. The guide may form part of the retractor housing.

As mentioned above, the structure 8 maintains the seat 1 in its initial illustrated position during ordinary use of the motor vehicle. However, should the roll-over sensor 11 detect a roll-over accident, the pyrotechnic charge within the chamber 12 will be activated, causing the piston to move within the chamber, thus changing the configuration of the seat. Part of the rod 13 will thus be drawn into the housing 10, moving the seat 1 to the position illustrated in solid lines in FIG. 2 (and shown in phantom in FIG. 1). It can be seen that the link 6 has moved pivotally with respect to the seat 1 and with respect to the floor 7. The squab 2 of the seat is thus moved forwardly and the rear part of the squab (including the upper surface of the rear part of the squab) is moved away from the roof of the vehicle. In the orientation illustrated the squab of the seat moves downwardly. In the orientation illustrated this has the effect of increasing the angle of inclination of the squab 2 of the seat and also has had the effect of moving the back 3 of the seat rearwardly. The squab and the seat back both move with a pivoting motion. The end result is that the head of the occupant of the seat has been moved away from the roof of the vehicle. In other words, in the orientation illustrated, the head of the occupant of the seat has been lowered relative to its initial position. Also, since the squab of the seat has moved forwardly, the knees of the occupant may be fixed beneath the dashboard or steering wheel, thus maintaining the occupant of the vehicle in a desired position. The bottom of the backrest also moves forwardly giving more space to any occupant of the vehicle behind the illustrated seat.

Since the safety belt 4 is secured to the seat, the occupant of the seat will be held firmly in the seat while the configuration of the seat is altered. It may be desirable to provide the safety belt with a pre-tensioner in order to ensure that the occupant of the seat is held very firmly in position. If the safety belt were connected to the floor of the vehicle, it would be most desirable for the safety belt to be provided with a pre-tensioner to ensure that the occupant is held firmly in position when the seat changes its configuration as shown.

The presence of the guide for the seat belt may assist the seat belt in retaining the occupant of the seat in the desired position relative to the seat even if the vehicle rolls completely over.

Figure 3:
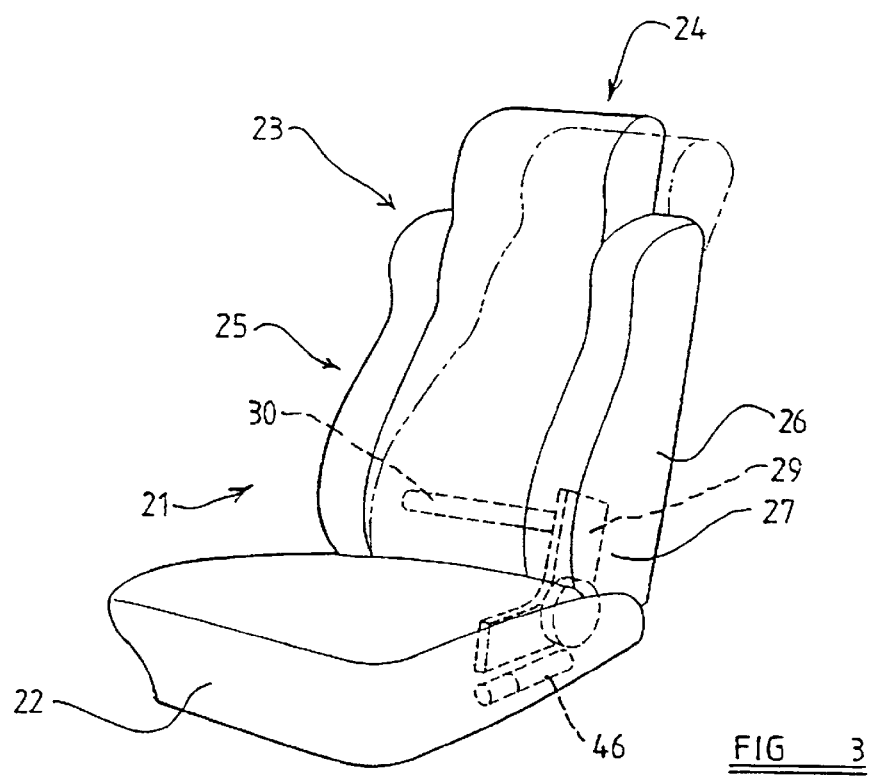
FIG. 3 is a view of a second form of vehicle seat in accordance with the invention, with parts of the seat being shown in phantom.
Figures 4, 5:
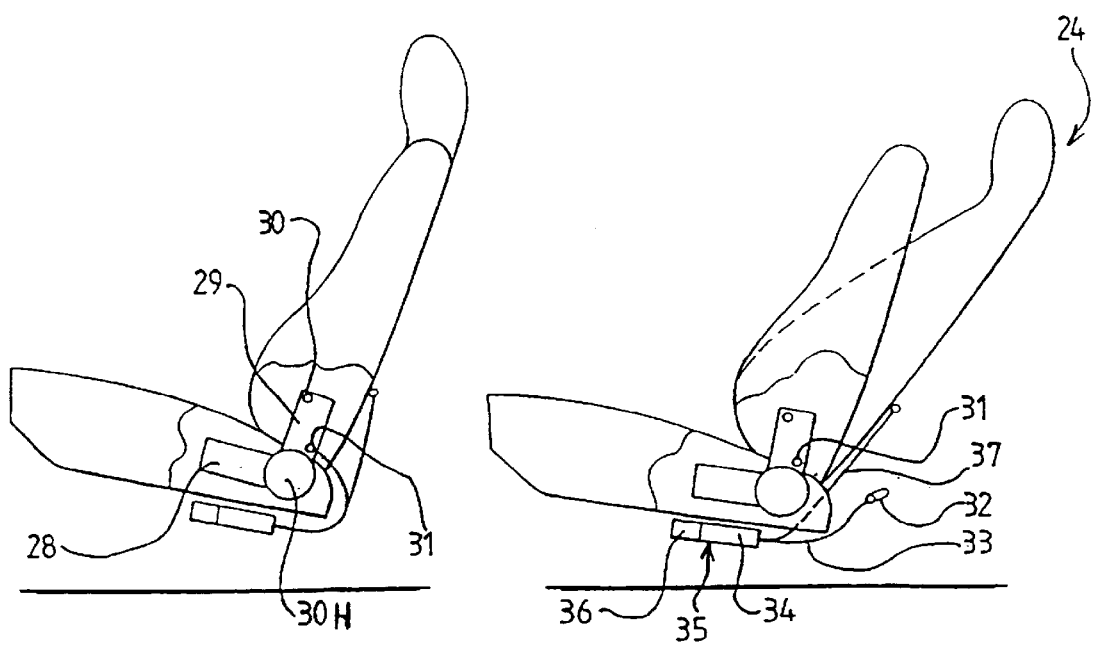
FIG. 4 is a side view of the seat of FIG. 3, with parts of the seat being cut away.
FIG. 5 is a view corresponding to FIG. 4, again with parts being cut away, showing the seat in an alternative position.

FIGS. 3 to 5 illustrate a second embodiment of the invention.

In this embodiment a seat 21 is provided which has a squab 22 and a back 23. The back 23 consists of a central part 24 which is located between two side parts 25, 26.

The seat incorporates a conventional "recliner" mechanism 27. As can be seen more clearly from FIG. 4, the recliner mechanism comprises a first arm 28 connected to the squab 22 of the seat and a second arm 29 which is located between the central part 24 of the back of the seat and the side part 26 of the back of the seat and which is connected to both the central part 24 and the side part 26 of the back of the seat. The arms 28 and 29 are inter-connected by a "hinge" assembly 30H which may be connected to an actuator knob (unshown) to provide the "reclining" effect. Such recliners are well-known.

The arm 29 carries a transversely extending pivot rod 30 on which the central part 24 of the back 23 of the seat is mounted so that the central part 24 can move pivotally, about the pivot rod 30, relative to the two side parts 25,26 of the seat. Thus the central part 24 of the back of the seat may move from the initial position shown in solid lines in FIG. 3 to the alternate position shown in dotted lines.

The plate 29 defines an aperture 31 which initially receives a plug 32 which extends through the aperture 31 and into a corresponding recess provided in the side of the central part 24 of the back 23 of the seat. When the plug 32 is in position in this way, the central part of the back of the seat is locked in position relative to the two side parts 25, 26 of the back of the seat, and the three parts at the back of the seat move as a single unitary component.

The plug 32 is connected by means of a wire 33 to a piston contained within a chamber 34 defined within a housing 35, the housing 35 also containing a roll-over sensor 36. The piston contained within the chamber 34 is connected by means of a further wire 37 to a point on the back of the central part 24 of the seat. The housing 35 is located beneath the squab 2 of the seat but may have an alternative location.

It is to be appreciated that in use of the embodiment illustrated in FIGS. 3 to 5, when no roll-over accident is sensed, the seat can be utilized as an ordinary seat. In the event that the roll-over sensor 36 senses a roll-over accident, the pyrotechnic charge within the chamber 34 is activated causing the piston to move along within the chamber, to cause the configuration of the seat to be altered. This applies tension to the wires 33 and 37. Initially the plug 32 is withdrawn from the aperture 31, meaning that the central part 24 of the back of the seat is free to move pivotally about the pivot shaft 30 relative to the two side parts 25 and 26. Subsequently tension applied to the wire 37 moves the central part 24 of the seat (including the front surface of the back of the seat) rearwardly relative to the side parts 25 and 26 so that the central part of the back of the seat occupies the position shown in FIG. 5 (and as shown in phantom in FIG. 3). The consequence of this is that the head of the occupant of the vehicle is lowered and also the torso of the occupant of the vehicle is moved to a position between the two side parts 25 and 26 of the back of the seat, thus providing the torso of the occupant of the seat with lateral support.

The seat of FIGS. 3 to 5 may incorporate a seat belt (not shown).

FIGS. 6 to 8 illustrate a further embodiment of the invention.

In this embodiment of the invention a seat 41 is provided having a squab 42 and a back 43.

Contained within the squab of the seat is an element 44 formed of a compressible material and contained within the back 43 of the seat is a further element 45, again formed of a compressible material.

A housing 46 is provided which contains a roll-over sensor 47 and which also defines a chamber 48 which receives a piston, the piston being connected to a wire 49. The wire 49 passes round a guide wheel 50 and then separates to form separate strands which perform different functions. One strand is connected to a buckle 51 of a safety belt 52 used to retain an occupant present in the seat 41. A further strand passes to a compressor arrangement 53 intended to alter the configuration of the squab of the seat by compressing the compressible element 44 provided in the squab 42 of the seat. This will serve to move part of the upper surface of the squab downwardly. A further strand passes to a compressor arrangement 54 intended to alter the configuration of the back of the seat by compressing part of the compressible element 45 present in the back 43 of the seat. This will serve to move part of the front surface of the back of the seat rearwardly. The compressor arrangement 54, which corresponds with the compressor arrangement 53, will now be described in greater detail with reference to FIG. 7.

As can be seen in FIG. 7, the strand of the wire 49 passing up the back 43 of the seat further splits to form individual filaments 55, 56, 57. Each filament passes over a guide 58, 59, 60 which is securely mounted in position and extends transversely across the compressible element 45, terminating in a plate 61, 62, 63. The plates 61, 62, 63 engage the front of the compressible element. It is to be appreciated that when a force is applied to the cable 49, by virtue of movement of the piston within the chamber 48, tension will be applied to the filaments 55, 56, 57, and the plates 61, 62, 63 will thus be caused to move towards the fixed guides 58, 59, 60. As a consequence the part of the compressible element 45 engaged by the plates 61, 62, 63 will be substantially compressed. This has) the effect of moving the front face of the top part of the back 43 of the seat in a rearward direction, altering the configuration of the back of the seat.

It is to be appreciated that the compression arrangement 53 will operate in a similar manner, and will cause the upper surface of the rear part of the squab 42 of the seat to move downwardly, altering the configuration of the squab of the seat.

Consequently it is to be appreciated that when the seat of FIGS. 6 to 8 is in use, should a roll-over accident be sensed, the rear part of the upper surface of the squab 42 will be lowered and the upper part of the front face of the back 43 of the seat will move rearwardly. Also, the seat belt 52 will be pre-tensioned. The occupant of the seat will thus be drawn firmly into the seat and as a consequence of the change of configuration of the seat, the position of the head of the occupant will be lowered.

A retractor 64 for the safety belt 52 is connected to the back of the seat.

What is claimed is:

1. A vehicle seat, comprising: a squab having an upper surface, a front part, and a rear part, a backrest having a front surface and a back surface, a roll-over sensor, and changing means coupled to the roll-over sensor and to at least one of the squab and the backrest and being activated by the roll-over sensor changing a configuration of at least one of the squab and the backrest so that clearance between the head of an occupant of the seat and the roof of the vehicle is increased.

2. A seat according to claim 1, wherein the changing means comprises means for moving at least part of the front surface of the backrest rearwardly.

3. A seat according to claim 1, wherein the changing means comprises means for moving at least part of the backrest rearwardly with a pivoting motion.

4. A seat according to claim 3 further comprising a central part of the backrest, wherein the changing means comprises means for moving the central part of the backrest rearwardly with a pivotal motion, the backrest comprising two further side parts which maintain their positions as the central part pivots, wherein the moving means comprises a cylinder, a piston movable within the cylinder, a pyrotechnic charge activated by the roll-over sensor and arranged for moving the piston within the cylinder, and a wire comprising at least one strand, and wherein the piston is connected to the wire and the strand is connected to the backrest for moving the central part of the backrest in a pivotal manner.

5. A seat according to claim 4, wherein the wire is connected to locking means for locking the central part of the backrest in an initial position relative to the side parts, and wherein the locking means will unlock upon tension being applied to the wire.

6. A seat according to claim 3, wherein the changing means comprises means for moving a central part of the backrest rearwardly with a pivotal motion, the backrest comprising two further side parts which remain in an initial position as the central part pivots.

7. A seat according to claim 1, wherein the changing means comprises means for moving at least part of the upper surface of the squab of the seat downwardly.

8. A seat according to claim 1, further comprising rigid pivotal links mounting the squab of the seat to a vehicle structure, wherein the changing means includes means for initially retaining the seat in a predetermined position, and responding to a roll-over accident sensed by the sensor to move the pivotal links to an alternate condition causing the rear part of the squab to be lowered and causing the backrest to move rearwardly.

9. A seat according to claim 8, wherein the pivotal links are arranged for moving the squab forwardly.

10. A seat according to claim 1, wherein at least one of the squab and backrest include a compressible element and the changing means comprises means for compressing the compressible element.

11. A seat according to claim 1, wherein the changing means comprises a cylinder and a piston movable within the cylinder and a pyrotechnic charge activated by the roll-over sensor and arranged for moving the piston within the cylinder.

12. A seat according to claim 11 wherein the pyrotechnic charge additionally actuates a pre-tensioner which pre-tensions a safety belt associated with the vehicle seat.

13. A seat according to claim 1 further comprising a safety belt which passes through guide means located at the backrest.

14. A seat according to claim 13 wherein the seat belt is associated with a retractor mounted on the seat.

15. A seat according to claim 1, further comprising rigid pivotal links mounting the squab to a vehicle structure, wherein the changing means includes means for initially retaining the seat in a predetermined position, and responding to a roll-over accident sensed by the sensor to move the pivotal links to an alternate condition causing the rear part of the squab to be lowered and causing the backrest to move rearwardly, wherein the changing means further comprises a housing containing the roll-over sensor and defining a cylinder, a piston movable within the cylinder, and a pyrotechnic charge activated by the roll-over sensor and arranged for moving the piston within the cylinder, and wherein the housing is connected to a chassis of a vehicle and the piston is connected to a rod which is connected to the squab for moving the squab.

16. A seat according to claim 1 wherein at least one of the squab and the backrest include a compressible element having at least two sides and the means to change the configuration of the seat comprise means to compress a compressible element present within the back or squab of the seat, wherein the changing means comprises a cylinder, a piston movable within the cylinder, a pyrotechnic charge activated by a roll-over sensor and arranged for moving the piston within the cylinder, a wire comprising at least one strand, and at least one guide located on at least one side of the compressible element and wherein the piston is connected to the wire, and the strand is passed across the guide and connected to another side of the compressible element so that tension applied to the strand causes the compressible element to be compressed.

* * * * *